(12) United States Patent
Jung

(10) Patent No.: US 10,665,264 B1
(45) Date of Patent: May 26, 2020

(54) VIDEO CONTAINER WITH EDITABLE PRESENTATION OBJECTS

(71) Applicant: Dell Products L.P., Round Rock, TX (US)

(72) Inventor: Ralph Jung, Dublin (IE)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/515,727

(22) Filed: Jul. 18, 2019

(51) Int. Cl.
| | |
|---|---|
| *H04N 5/92* | (2006.01) |
| *H04N 5/917* | (2006.01) |
| *G11B 27/034* | (2006.01) |
| *G06T 13/00* | (2011.01) |
| *G11B 27/036* | (2006.01) |
| *G11B 27/06* | (2006.01) |
| *G11B 27/34* | (2006.01) |

(52) U.S. Cl.
CPC ............ *G11B 27/034* (2013.01); *G06T 13/00* (2013.01); *G11B 27/036* (2013.01); *G11B 27/06* (2013.01); *G11B 27/34* (2013.01)

(58) Field of Classification Search
CPC ..... G11B 27/034; G11B 27/036; G11B 27/06; G11B 27/34; G06T 13/00
USPC .......................... 386/241, 326, 328, 353, 354
See application file for complete search history.

(56) References Cited

U.S. PATENT DOCUMENTS

| | | |
|---|---|---|
| 2005/0185920 A1 | 8/2005 | Harper et al. |
| 2005/0216922 A1 | 9/2005 | Mogilevsky et al. |
| 2005/0235293 A1 | 10/2005 | Fortes et al. |
| 2007/0262996 A1 | 11/2007 | Fernandez et al. |
| 2014/0253560 A1 | 9/2014 | Niles et al. |
| 2015/0346969 A1 | 12/2015 | Strabbing et al. |
| 2017/0285918 A1* | 10/2017 | Shah ................... G06F 3/04845 |
| 2018/0324404 A1* | 11/2018 | Sevigny .................. G06T 11/60 |

OTHER PUBLICATIONS

Wikipedia, "AVCHD," https://en.wikipedia.org/w/index.php?title=AVCHD&oldid=900032096, Jun. 3, 2019, 19 pages.
Wikipedia, "Microsoft PowerPoint," https://en.wikipedia.org/w/index.php?title=Microsoft_PowerPoint&oldid=902353973, Jun. 18, 2019, 49 pages.

(Continued)

*Primary Examiner* — Robert Chevalier
(74) *Attorney, Agent, or Firm* — Ryan, Mason & Lewis, LLP

(57) ABSTRACT

A processing device is configured to obtain at least one video track comprising compressed video, and to combine the video track with one or more presentation objects into a video container. The one or more presentation objects are configured for presentation in an object layer arranged as an overlay relative to a video layer comprising decompressed video of the video track in conjunction with playback of the video container. For example, the one or more presentation objects can comprise images, sets of text and/or animation objects. The one or more presentation objects are illustratively editable by a user subsequent to the combination of those presentation objects with the video track into the video container, and remain separate from the video track and any associated audio tracks and/or sets of subtitles in the video container.

20 Claims, 8 Drawing Sheets

(56) References Cited

OTHER PUBLICATIONS

Wikipedia, "MPEG-4 Part 14," https://en.wikipedia.org/w/index.php?title=MPEG-4_Part_14&oldid=899736391, Jun. 1, 2019, 5 pages.
Wikipedia, "Matroska," https://en.wikipedia.org/w/index.php?title=Matroska&oldid=895981653, May 7, 2019, 3 pages.
Wikipedia, "Audio Video Interleave," https://en.wikipedia.org/w/index.php?title=Audio_Video_Interleave&oldid=901129057, Jun. 9, 2019, 3 pages.
Wikipedia, "DVD," https://en.wikipedia.org/w/index.php?title=DVD&oldid=903264177, Jun. 24, 2019, 15 pages.
Wikipedia, "Blu-ray," https://en.wikipedia.org/w/index.php?title=Blu-ray&oldid=902453602, Jun. 18, 2019, 28 pages.
Wikipedia, "Adobe Premiere Pro," https://en.wikipedia.org/w/index.php?title=Adobe_Premiere_Pro&oldid=902124134, Jun. 16, 2019, 11 pages.
Wikipedia, "Final Cut Pro X," https://en.wikipedia.org/w/index.php?title=Final_Cut_Pro_X&oldid=901325943, Jun. 11, 2019, 10 pages.
Wikipedia, "Blender (software)," https://en.wikipedia.org/w/index.php?title=Blender_(software)&oldid=902603485, Jun. 19, 2019, 23 pages.

\* cited by examiner

Container File Structure

Video Tracks
- Video Track 1
- Video Track 2

Audio Tracks
- Audio Track German
- Audio Track French
- Audio Track English

Subtitles
- Subtitles German
- Subtitles French
- Subtitles English

Images
- Image 1 German
- Image 1 French
- Image 1 English

Onscreen Texts
- Text 1 German
- Text 1 French
- Text 1 English

Fonts
- Font 1
- Font 2

Object Instructions
- Instruction List 1
- Instruction List 2
- Instruction List 3

FIG. 3

Pseudocode example for displaying a logo on top of a video track:

```
<Image>
<Time begin='00:00:00.000'>
<File name ='GermanLogo1.jpg'>
<Coordinates upperleft = (-20,-20) resize-with-video = 'true'>
<Effects fade-in = 'false' fade-out = 'true'>
<Time end='00:00:08.000'>
</Image>
```

Pseudocode example for displaying onscreen text on top of a video track:

```
<OnscreenText>
<Time begin='00:00:12.000'>
<Text ='Willkommen' language = 'DE-DE'>
<TextStyle fontname = 'Bank Gothic' fontsize = '36' fontweight = 'normal'>
<TextShape type = banner09>
<Coordinates upperleft = (-100,-100) resize-with-video = 'true'>
<Effects fade-in = 'true' fade-out = 'true' shadow = 'lowerright'>
<Time end='00:00:24.000'>
</OnscreenText>
```

VIDEO CONTAINER WITH EDITABLE PRESENTATION OBJECTS

FIELD

The field relates generally to video processing, and more particularly to data structures and associated processing operations used in video generation and playback.

BACKGROUND

Video generation often involves the use of sophisticated video editing software. Such software typically works with an uncompressed intermediate file format that is editable, but once the video is finalized and compressed, there is no longer an ability to edit the video in any significant way. Any changes that are needed at this point would typically require further involvement of a professional video editor, and would include operations such as decompressing the compressed video and/or accessing the corresponding original video source files, followed by editing using the video editing software, and then finalizing and recompressing the edited video. Such operations are generally well beyond the skill level of the typical end user. For example, a reviewer of a particular finalized video that detects a need for one or more changes to that video is usually not a professional video editor, and does not have access to the original video source files and the video editing software used to create the video. The reviewer therefore has to send any such changes back to the professional video editor, who will generate an updated version to send back to the reviewer. Conventional approaches of this type make the process of reviewing and editing videos unduly time-consuming and expensive.

SUMMARY

Illustrative embodiments provide video containers with editable presentation objects. For example, some embodiments are in the form of video container generation and/or playback platforms that are configured for respective generation and/or playback of video containers with editable presentation objects. Such video container generation and/or playback functionality can be implemented on a single platform such as a computer, a client, a server, a mobile telephone, a media player, a gaming system, or other type of platform, or can be distributed across multiple such platforms interconnected by one or more networks. A wide variety of other arrangements are possible.

Some embodiments are advantageously configured to allow editing of videos to be performed by relatively unsophisticated users, without the need for professional video editors or overly complex video editing software. Reviewers can in many cases make their own revisions through simple editing of the presentation objects. The time and cost associated with video editing is thereby considerably reduced.

In one embodiment, an apparatus comprises at least one processing device comprising a processor coupled to a memory. The processing device is configured to obtain at least one video track comprising compressed video, and to combine the video track with one or more presentation objects into a video container. The one or more presentation objects are configured for presentation in an object layer arranged as an overlay relative to a video layer comprising decompressed video of the video track in conjunction with playback of the video container. For example, the one or more presentation objects can comprise images, sets of text and/or animation objects.

The one or more presentation objects are illustratively editable by a user subsequent to the combination of those presentation objects with the video track into the video container, and remain separate from the video track and any associated audio tracks and/or sets of subtitles in the video container.

These and other illustrative embodiments include, without limitation, methods, apparatus, information processing systems, and computer program products comprising processor-readable storage media.

BRIEF DESCRIPTION OF THE DRAWINGS

FIG. 3 shows an example of a container file structure of a video container with editable presentation objects in an illustrative embodiment.

FIGS. 5 and 6 show respective pseudocode examples for displaying presentation objects including a logo and onscreen text on top of a video track in illustrative embodiments.

DETAILED DESCRIPTION

Illustrative embodiments will be described herein with reference to exemplary information processing systems comprising one or more computers, clients, servers, mobile telephones, media players, gaming systems and other types of platforms each comprising one or more processing devices. It is to be appreciated, however, that these and other embodiments are not restricted to the particular illustrative system and device configurations shown. Accordingly, the term "information processing system" as used herein is intended to be broadly construed, so as to encompass, for example, enterprise-based systems, cloud-based systems as well as a wide variety of other systems. An information processing system can comprise various combinations of physical and virtual processing resources, such as a data center or other cloud-based system that includes one or more clouds hosting multiple tenants that share cloud resources. These and numerous other types of systems are encompassed by the term "information processing system" as broadly used herein.

Figure 1:
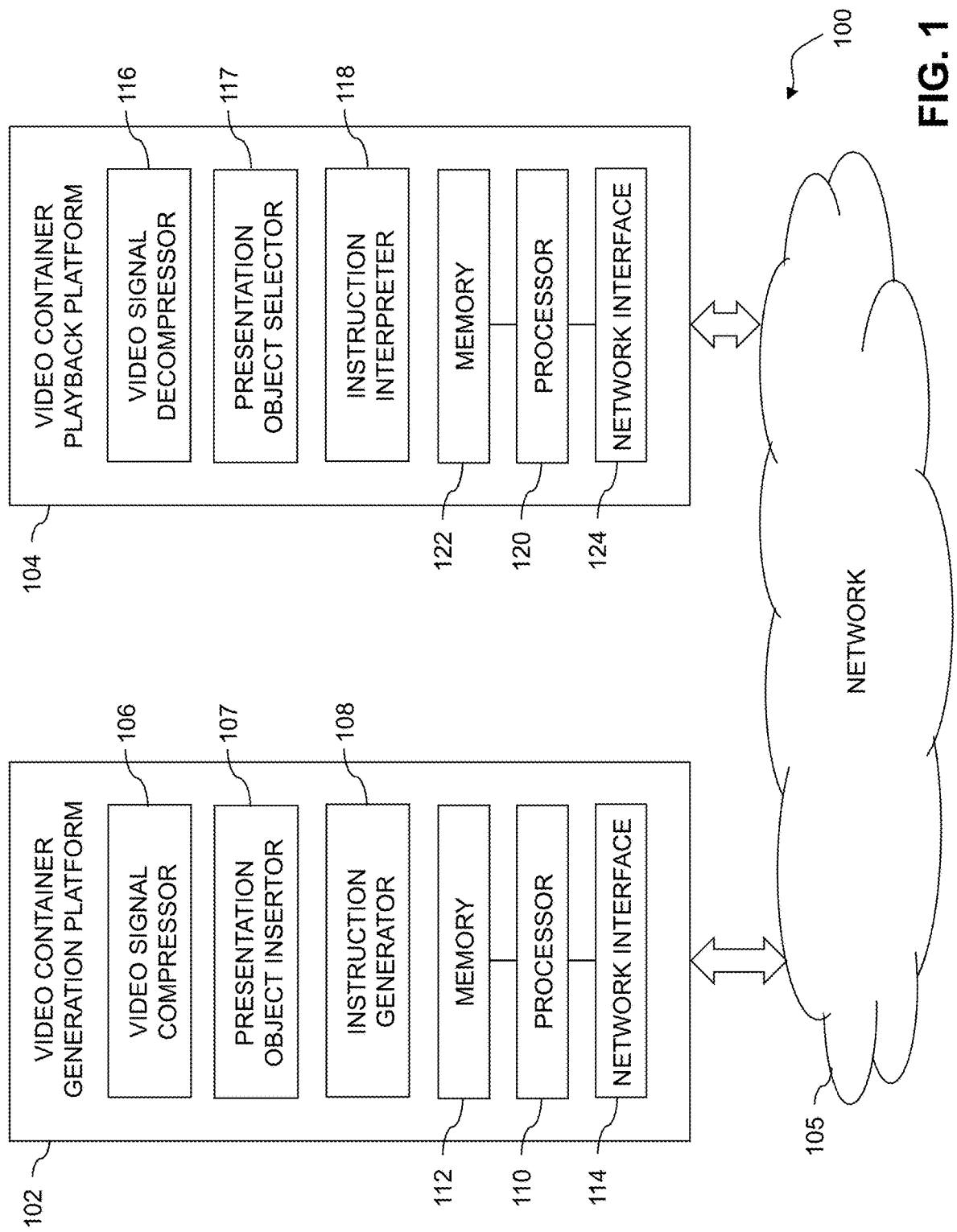
FIG. 1 is a block diagram of an information processing system including video container generation and playback platforms utilizing video containers with editable presentation objects in an illustrative embodiment.

FIG. 1 shows an information processing system 100 configured in accordance with an illustrative embodiment. The information processing system 100 in this embodiment comprises a video container generation platform 102 configured to communicate with a video container playback platform 104 over a network 105.

The network 105 may comprise any of a variety of different types of networks, including by way of example a global computer network such as the Internet, a wide area network (WAN), a local area network (LAN), a satellite network, a telephone or cable network, a cellular network, a wireless network such as a WiFi or WiMAX network, or various portions or combinations of these and other types of networks.

The network 105 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art. The term "network" as used herein is intended to be broadly construed, and may encompass, for example, an internal network of a given system that implements at least one of the platforms 102 and 104.

Figure 7:
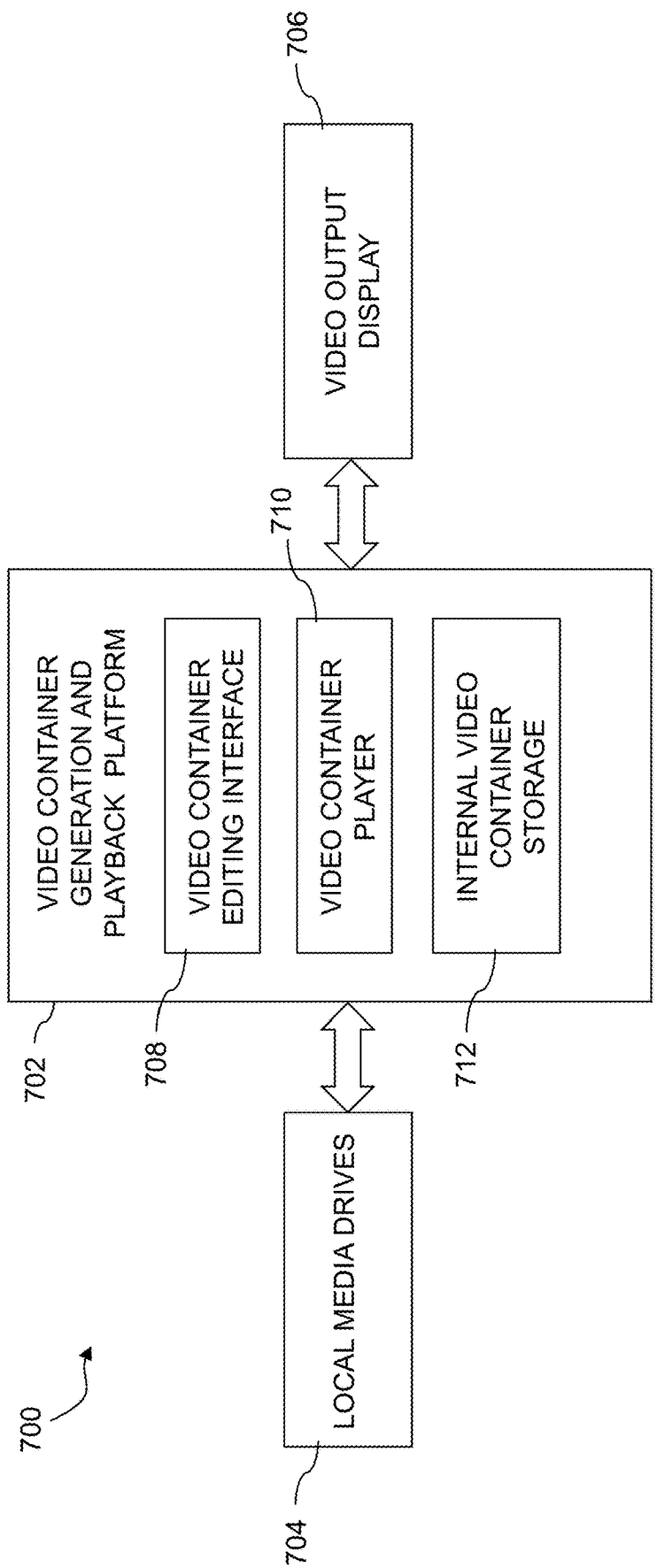
FIG. 7 shows another information processing system with video container generation and playback functionality in an illustrative embodiment.

Although the video container generation platform 102 and video container playback platform 104 are illustrated as separate platforms interconnected by network 105 in this embodiment, such an arrangement is presented by way of example only, and should not be construed as limiting in any way. In other embodiments, video container generation and/or playback functionality as disclosed herein can be implemented on a single platform such as a computer, a client, a server, a mobile telephone, a media player, a gaming system, or other type of platform. A wide variety of other arrangements are possible, including alternative arrangements of multiple platforms interconnected by one or more networks of various types. It is to be appreciated, however, that networks are not required in implementing illustrative embodiments. Accordingly, although some embodiments are network-based, numerous other embodiments are not. For example, video containers with editable presentation objects as disclosed herein can be stored in any type of storage device, and can therefore be easily edited and played from an optical disk, memory card or local storage drive of a computer or other processing device without the processing device necessarily communicating over a network. A more particular example of an information processing system with video container generation and playback functionality that does not necessarily involve use of a network is shown in FIG. 7.

It should also be noted that references herein to "video container generation" are intended to be broadly construed, so as to encompass arrangements involving editing of an existing video container, such as editing its presentation objects to alter a manner in which those presentation objects are displayed in conjunction with a video track.

The operation of the video container generation platform 102 and the video container playback platform 104 will now be described in more detail. Examples of respective video container generation and playback processes illustratively performed by the platforms 102 and 104 will then be described in conjunction with FIGS. 2A and 2B, with other example video container features being further described in conjunction with FIGS. 3 through 6.

The video container generation platform 102 illustratively comprises a video signal compressor 106, a presentation object insertor 107 and an instruction generator 108.

The video signal compressor 106 compresses a video signal to obtain at least one video track comprising compressed video. As will be described in more detail below, the video track is combined with one or more presentation objects into a video container that can be delivered over the network 105 or otherwise made available to one or more system users for editing and/or playback. For example, the video container can be streamed over network 105 from a server to a client. Multiple video tracks each comprising compressed video can be included in a single video container.

Although the video container generation platform 102 in this embodiment includes video signal compression functionality via its video signal compressor 106, in other embodiments a video signal can be compressed on another platform and provided to the platform 102 for insertion as compressed video into a video container. Accordingly, in other embodiments, video compression can be performed on a different platform than that used to generate the video container.

The presentation object insertor 107 illustratively inserts the one or more presentation objects into the video container. The video track is therefore combined with the one or more presentation objects into the video container. An example of the resulting video container is shown in FIG. 3. The one or more presentation objects are illustratively configured for presentation in an object layer arranged as an overlay relative to a video layer comprising decompressed video of the video track in conjunction with playback of the video container. An example of presentation of this type will be described below in conjunction with FIG. 4.

Sets of instructions generated by the instruction generator 108 are also inserted into the video container in some embodiments. Such instructions are used to determine the particular manner in which the one or more presentation objects will be presented in conjunction with the video track upon playback of the video container. For example, certain presentation objects may be presented for particular periods of time, in particular positions, using particular effects, using particular fonts, etc.

The one or more presentation objects remain editable by a user subsequent to the combination of those presentation objects with the video track into the video container. For example, such presentation objects are separate from the video tracks that contain compressed video, and can be easily edited by a user without any need to decompress and recompress the compressed video.

In addition to the one or more video tracks, the one or more presentation objects, and any associated object instructions, a video container in illustrative embodiments can further include one or more audio tracks associated with the one or more video tracks, one or more sets of subtitles associated with the one or more video tracks, and/or other types of information related to playback of the one or more video tracks. The one or more presentation objects are assumed to be separate from any audio tracks and subtitles associated with a given video track. The term "presentation object" as used herein is intended to be broadly construed, but to exclude audio tracks and subtitles associated with video tracks.

In some embodiments, the one or more presentation objects of the video container illustratively comprise at least one image, at least one set of text and/or at least one animation object. Various combinations of multiple images, sets of text, animation objects and/or other types of presentation objects can be used. For example, the video container to be described below in the context of FIG. 3 includes multiple images in respective distinct languages, as well as multiple sets of text ("onscreen texts") also in the respective distinct languages. Examples of onscreen texts include messages, feature call-outs, titles, headers, speaker name and job title, etc. It is important to note that such sets of text are distinct from any sets of subtitles that are present in the video container. As indicated above, subtitles are excluded from the scope of "presentation objects" as that term is utilized herein. Closed caption information is similarly excluded from the scope of presentation objects herein.

As another example, the one or more presentation objects illustratively comprise a plurality of distinct images, with at least a particular one of the plurality of distinct images being automatically selected for presentation in the above-noted object layer in conjunction with playback of the video container.

As a further example, the one or more presentation objects illustratively comprise a plurality of distinct sets of text, with at least a particular one of the plurality of distinct sets of text being automatically selected for presentation in the object layer in conjunction with playback of the video container.

As yet another example, the one or more presentation objects illustratively comprise a plurality of distinct animations, with at least a particular one of the plurality of distinct animations being automatically selected for presentation in the object layer in conjunction with playback of the video container.

Again, various combinations of one or more images, one or more sets of text, one or more animation objects and/or one or more other types of presentations objects can be incorporated into a video container as disclosed herein. Thus, for example, the one or more presentation objects of a given video container can include only an image and no set of text or animation object, or only a set of text and no image or animation object. Numerous other arrangements of one or more presentation objects are possible in a given video container.

As indicated previously, a video container in some embodiments further comprises one or more sets of instructions for controlling automatic selection and presentation of at least a particular one of the one or more presentation objects in the object layer in conjunction with playback of the video container.

By way of example, the one or more sets of instructions are editable by a user to adjust a manner in which the one or more presentation objects are presented in the object layer in conjunction with playback of the video container.

Additionally or alternatively, a video container in some embodiments further comprises one or more sets of embedded fonts for rendering text of at least one of the one or more presentation objects in conjunction with playback of the video container.

In some embodiments, the one or more presentation objects comprise a plurality of presentation objects in respective different languages, and user selection of at least one of an audio track in a given language and a set of subtitles in the given language automatically triggers selection for presentation in the overlay layer of at least a corresponding one of the presentation objects in the given language to the exclusion of one or more other ones of the presentation objects not in the given language.

A video container in some embodiments has a container file structure that accommodates multiple video tracks, audio tracks and subtitles, as well as a plurality of editable presentation objects of different types. For example, the presentation objects illustratively comprise any number of additional images, texts, animations and other visual elements that are maintained separately from the video tracks without the need for permanently merging of any presentation object into the video tracks.

The video container also contains object instructions which illustratively direct a media player or other type of video container player to render particular presentation objects in a particular manner in conjunction with playback of a video track. For example, the object instructions can define timing, coordinates and effects for real-time display of the presentation objects in coordination with an underlying video track. Presentation objects and their associated object instructions can be easily replaced, altered or otherwise edited without requiring any new rendering or exporting from complex video editing software. In order to allow presentation objects comprising onscreen text to remain editable on a wide variety of different processing platforms, the video container can also include multiple embedded fonts.

As indicated above, presentation objects that are added to a given video container can be linked to a specific audio or subtitle language, so that when a user changes the video language in a video container player, the video container player will thereafter display the video along with the presentation objects that are specific to that selected language. Such arrangements allow users to see the video as if it was entirely tailored to their language.

Additionally or alternatively, a video container can be configured to store multiple distinct video scenes, with particular video scenes being played only when a corresponding language has been selected. For example, if the user selects French, that user might see a different opening scene than if the user had selected German.

Presentation objects as disclosed herein can also be enabled, disabled or omitted entirely for a selected language. For example, if a certain product that is showcased in the video is not available in French-speaking markets, the video could skip the corresponding scene, or alternatively display a line of onscreen text that explains the market situation and which is only visible when French is selected.

In some embodiments, the video container can contain a video title, description and other metadata as separate fields for each language, such that when the language is changed in the video container player, the video title, description and other metadata change as well.

A given video container is illustratively configured to store the above-noted presentation objects, object instructions and metadata separately from the video tracks, audio tracks and subtitles. An editing interface of a processing platform is configured that lets users remove, replace, modify or otherwise edit presentation objects without altering the video tracks, audio tracks and subtitles.

It should be noted that video container metadata of the type described above and elsewhere herein can be used for a wide variety of different purposes in different embodiments. For example, in some embodiments, metadata such as title and description in a particular language can be extracted and utilized to populate playlists on a playback platform or other type of processing platform. Such an arrangement advantageously allows a user that has specified a particular preferred language to have his or her playlist automatically generated and presented with all video titles in that preferred language, by suitable extraction and processing of the metadata of the corresponding video containers.

As a more particular example, if the videos are uploaded to YouTube or another Internet-based video distribution platform in respective video containers of the type disclosed herein, the video distribution platform can be configured to utilize the video container metadata to automatically display the video titles of the playlist in French to French users, in German to German users, and so on. The video container metadata can be similarly utilized to automatically populate databases, web pages or other informational elements with titles and descriptions in a preferred language of the corresponding user.

As mentioned previously, the video container generation platform 102 in the FIG. 1 embodiment is assumed to be implemented using at least one processing device. More particularly, the platform 102 in this embodiment comprises a processor 110 coupled to a memory 112 and a network interface 114.

The processor 110 illustratively comprises a microprocessor, a microcontroller, an application-specific integrated circuit (ASIC), a field-programmable gate array (FPGA), a graphics processing unit (GPU) or other type of processing circuitry, as well as portions or combinations of such circuitry elements.

The memory 112 illustratively comprises random access memory (RAM), read-only memory (ROM), flash memory or other types of memory, in any combination. The memory 112 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, an integrated circuit containing electronic memory, or a wide variety of other types of computer program products comprising processor-readable storage media. The term "article of manufacture" as used herein should be understood to exclude transitory, propagating signals.

The network interface 114 allows the platform 102 to communicate with the platform 104 over the network 105. The network interface 114 illustratively comprises one or more conventional transceivers.

Particular components of the video container generation platform 102, such as the video signal compressor 106, the presentation object insertor 107 and the instruction generator 108, are illustratively implemented at least in part in the form of software that is stored in memory 112 and executed by processor 110.

The video container playback platform 104 illustratively comprises a video signal decompressor 116, a presentation object selector 117 and an instruction interpreter 118.

The video signal decompressor 116 decompresses compressed video of a video track of a video container. As described previously, the video container combines one or more presentation objects with at least one video track comprising compressed video. The video container can be received over the network 105 from the video container generation platform 102, or otherwise obtained by the video container playback system 104. For example, in some embodiments, a video container can be obtained from an optical disk, memory card or local storage drive of a computer or other processing device that implements the video container playback platform 104. The video container playback platform 104 presents the one or more presentation objects in an object layer arranged as an overlay relative to a video layer comprising decompressed video of the video track in conjunction with playback of the video container.

This illustratively involves utilization of the presentation object selector 117 and the instruction interpreter 118. For example, the presentation object selector 117 selects particular ones of the presentation objects for presentation at different times and in other different manners over the course of the playback of the video container, based at least in part in interpretation of corresponding sets of instructions within the video container by the instruction interpreter 118. User input indicative of selection of particular ones of the presentation objects can additionally or alternatively be used. As indicated previously, the sets of instructions in some embodiments determine the particular manner in which the one or more presentation objects will be presented in conjunction with the video track upon playback of the video container. For example, certain presentation objects may be presented for particular periods of time, in particular positions, using particular effects, using particular fonts, etc.

Like the video container generation platform 102, the video container playback platform 104 is assumed to be implemented using at least one processing device. More particularly, the platform 104 in this embodiment comprises a processor 120 coupled to a memory 122 and a network interface 124. These components are configured in a manner similar to that previously described for the respective corresponding components 110, 112 and 114 of the video container generation platform 102.

Although not explicitly shown in FIG. 1, a video monitor or other type of display device is assumed to be incorporated in or otherwise associated with the video container playback platform 104, for displaying rendered video with presentation objects in conjunction with playback of a video container.

Again, although shown as separate platforms in this illustrative embodiment, platforms 102 and 104 in other embodiments can be implemented as a single platform having both video container generation and playback functionality. For example, a given computer, mobile telephone or other type of platform comprising at least one processing device can be configured to capture video signals and to generate corresponding video containers that each combine one or more video tracks with one or more presentation objects, and also to playback video containers received from other platforms each comprising one or more processing devices.

Terms such as "platform" and "processing device" as used herein are therefore intended to be broadly construed. In some embodiments, one or both of platforms 102 and 104 can be part of a cloud-based data center or other cloud-based computer system, or part of an enterprise-based computer system.

A given cloud-based implementation of platform 102 or 104 illustratively includes commercially-available cloud infrastructure, such as an allocated portion of an Amazon Web Services (AWS) system. Other examples of cloud-based systems that can be used to implement one or more of the platforms 102 and 104 of system 100 include Google Cloud Platform (GCP) and Microsoft Azure.

A cloud-based system of this type illustratively comprises a Platform-as-a-Service (PaaS) layer overlying an Infrastructure-as-a-Service (IaaS) layer. The IaaS layer may comprise a plurality of virtual machines supporting application containers of the PaaS layer. For example, host devices in such an embodiment illustratively correspond to respective ones of the virtual machines of the IaaS layer. Additional or alternative layers may be used in implementing the platform 102 and/or the platform 104, including by way of example a Function-as-a-Service (FaaS) layer.

The platforms 102 and 104 are assumed to be accessible to one or more system users. The term "user" in this context and elsewhere herein is intended to be broadly construed so as to encompass, for example, human, hardware, software or firmware entities, as well as various combinations of such entities. At least some of the system users can be associated with respective different ones of the platforms 102 and 104.

One or both of the platforms 102 and 104 can incorporate various types of storage systems. For example, a given such storage system illustratively comprises at least one VNX® or Symmetrix VMAX® storage array from Dell EMC of Hopkinton, Mass. Other types of storage arrays that may be used in illustrative embodiments include scale-out all-flash content addressable storage arrays such as XtremIO™ storage arrays, also from Dell EMC. The storage system is illustratively configured to store video containers of the type disclosed herein. However, the term "storage system" as the term is broadly used herein is not limited to storage arrays, but can comprise other types of storage systems. For example, a storage system can comprise network-attached storage (NAS), storage area networks (SANs), direct-attached storage (DAS) and distributed DAS, as well as combinations of these and other storage types, including software-defined storage.

It is to be appreciated that the particular arrangements of components of system 100 as illustrated in FIG. 1 are presented by way of example only, and alternative arrangements can be used in other embodiments. For example, the video container generation functionality associated with the set of components 106, 107 and 108, or the video container playback functionality associated with the set of components 116, 117 and 118, can in other embodiments be distributed across a larger number of modules, or combined into a single module.

In other embodiments, only subsets of these components, or additional or alternative sets of components, may be used, and such components may exhibit alternative functionality and configurations. In addition, as previously noted, such components can be part of the same processing platform.

The operation of the information processing system 100 will now be described in further detail with reference to the flow diagrams of the illustrative embodiments of FIGS. 2A and 2B, which show respective processes for video container generation and playback. These processes can be implemented by respective ones of the platforms 102 and 104 in the context of the FIG. 1 embodiment, although numerous other arrangements are possible. Also, any references to networks in these processes are by way of illustrative example only, as alternative embodiments do not require use of networks.

Figure 2A:
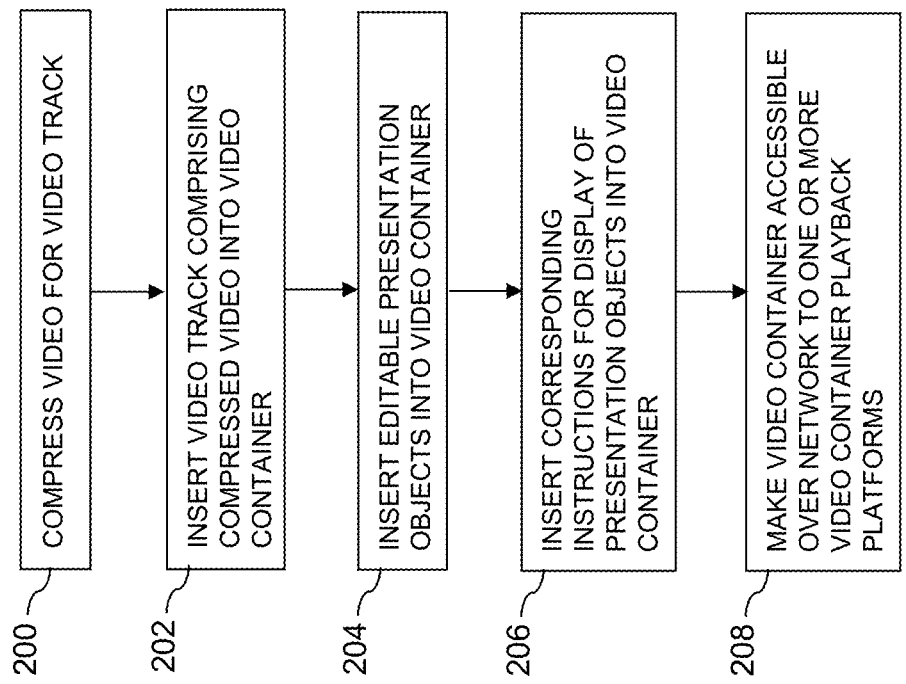
FIGS. 2A and 2B are flow diagrams of respective video container generation and playback processes in illustrative embodiments.

Referring now to FIG. 2A, a video container generation process in this embodiment comprises steps 200 through 208.

In step 200, video of a given video track is compressed.

In step 202, the video track comprising compressed video is inserted into a video container, illustratively in combination with one or more associated audio tracks. Any of a wide variety of different techniques can be used to compress video of a video track and/or combine it with an associated audio track, such as MPEG-4 (MP4), H.264, High Efficiency Video Coding (HEVC), MKV, Audio Video Interleave (AVI), Google VP9, etc.

In step 204, editable presentation objects are inserted into the video container.

In step 206, corresponding instructions for display of the presentation objects are inserted into the video container.

In step 208, the resulting video container is made accessible over a network to one or more video container playback platforms. Additionally or alternatively, the video container can be stored locally for playback or transferred to an optical disk, memory card or other type of storage device so as to be made available for playback on another platform.

Figure 2B:
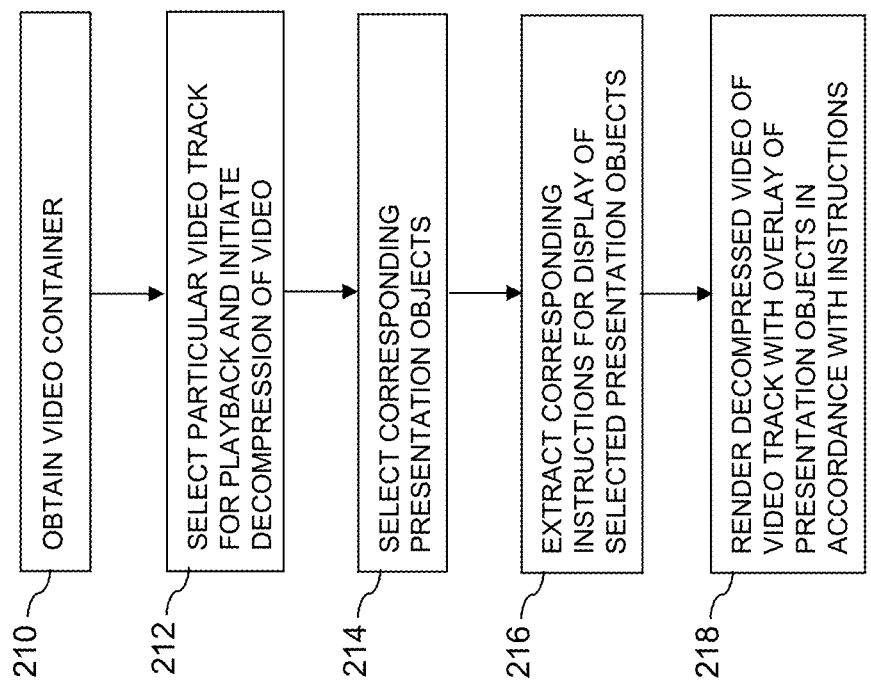

Referring now to FIG. 2B, a video container playback process in this embodiment comprises steps 210 through 218.

In step 210, a video container is obtained for playback. The video container may be obtained over a network from another platform, from local storage on the playback platform, and/or from an optical disk, memory card or other type of storage device.

In step 212, a particular video track is selected for playback and decompression of video of the selected video track is initiated.

In step 214, corresponding presentation objects of the video container are selected.

In step 216, corresponding instructions are extracted from the video container for display of the selected presentation objects.

In step 218, the decompressed video of the video track is rendered with overlay of presentation objects in accordance with the extracted instructions.

The particular processing operations and other system functionality described in conjunction with the flow diagrams of FIGS. 2A and 2B are presented by way of illustrative example only, and should not be construed as limiting the scope of the disclosure in any way. Alternative embodiments can use other types of processing operations for implementing video container generation and playback functionality as disclosed herein.

For example, the ordering of the process steps may be varied in other embodiments, or certain steps may be performed at least in part concurrently with one another rather than serially. Also, one or more of the process steps may be repeated periodically, or multiple instances of the processes can be performed in parallel with one another in order to implement a plurality of different video container generation and playback processes within a given information processing system.

Functionality such as that described in conjunction with the flow diagrams of FIGS. 2A and 2B can be implemented at least in part in the form of one or more software programs stored in memory and executed by a processor of a processing device such as a computer or server. As indicated previously, a memory or other storage device having executable program code of one or more software programs embodied therein is an example of what is more generally referred to herein as a "processor-readable storage medium."

Additional illustrative embodiments will now be described with reference to FIGS. 3 through 7.

FIG. 3 shows an example of a container file structure of a video container 300 with editable presentation objects in an illustrative embodiment. The video container 300 is illustratively generated using a video container generation process such as that of FIG. 2A.

In this example, the video container 300 comprises a plurality of video tracks 302 including first and second distinct video tracks denoted Video Track 1 and Video Track 2. It is assumed that a user via an interface of a playback platform such as computer, mobile telephone or media player can select a particular one of the multiple video tracks 302 for playback. The video tracks 302 are assumed to comprise compressed video. The compressed video of at least one of the video tracks 302 is decompressed and presented in a video layer having an overlying object layer in conjunction with playback of the video container 300.

The video container 300 in this example further comprises a plurality of audio tracks 304 associated with the video tracks 302, and a plurality of sets of subtitles 306 associated with the video tracks 302. More particularly, there are three distinct audio tracks, one in each of the German, French and English languages. Similarly, there are three distinct sets of subtitles, again one in each of the German, French and English languages. It is further assumed that the user can select a particular language for the video container playback, possibly via the above-noted user interface, which automatically causes a corresponding one of the audio tracks 304 or a corresponding one of the sets of subtitles 306 to be selected for presentation with the selected video track as part of the playback of the video container.

The video container 300 in this example further comprises editable presentation objects that are separate from the above-noted audio tracks and subtitles. These include a plurality of images 308 and a plurality of sets of text 310.

The images 308 include three distinct images denoted Image 1 German, Image 1 French and Image 1 English.

The sets of text 310, also referred to as "onscreen texts," include three distinct sets of text denoted Text 1 German, Text 1 French and Text 1 English.

A wide variety of other types and arrangements of presentation objects can be included in a video container as disclosed herein. For example, a video container can include animation objects in addition to or in place of the images and onscreen texts shown in the example of FIG. 3. As indicated previously, such presentation objects are separate from any audio tracks 304 and subtitles 306 that are also part of the video container 300. Moreover, such presentation objects are editable by a user subsequent to the combination of those presentation objects with the video tracks 302 into the video container 300.

The video container 300 in the example of FIG. 3 further comprises three distinct sets of instructions 312 for controlling automatic selection and presentation of corresponding ones of the presentation objects in an object layer in conjunction with playback of the video container 300. The sets of instructions 312 in this example, also referred to as "object instructions," are denoted Instruction List 1, Instruction List 2 and Instruction List 3. It is assumed that these object instructions control the particular manner in which respective ones of the three images 308 and respective ones of the three onscreen texts 310 are presented in the object layer overlying a video layer that comprises the selected video track. The object instructions are editable by a user to adjust a manner in which the presentation objects are presented in the object layer in conjunction with playback of the video container 300.

More particular illustrations of such object instructions will be described below in conjunction with the pseudocode examples of FIGS. 5 and 6, which control presentation of an image (e.g., a logo) and an onscreen text, respectively. Such pseudocode is considered a "set of instructions" as that latter term is broadly used herein.

The video container 300 as shown in FIG. 3 further comprises multiple sets of embedded fonts 314 for rendering text of particular ones of the onscreen texts in conjunction with playback of the video container 300. These sets of embedded fonts 314 illustratively include sets of embedded fonts denoted as Font 1 and Font 2.

Particular ones of the images 308 and onscreen texts 310 may be automatically selected for presentation in the object layer in conjunction with playback of the video container 300, with the selected images 308 and onscreen texts 310 being rendered in accordance with corresponding ones of the sets of instructions 312.

For example, in some embodiments the video container 300 is configured such that user selection of a particular one of the audio tracks 304 in a given language and/or of a particular one of the sets of subtitles 306 in a given language automatically triggers selection of corresponding ones of the images 308 and onscreen texts 310 in that same language for presentation in the overlay layer, to the exclusion of other ones of the images 308 and onscreen texts 310 not in that same language.

Illustrative embodiments include video containers such as video container 300 that each comprise one or more editable presentation objects, where the video containers are streamed over a network, as from a server to a client, and/or stored in a processor-readable storage medium of a computer program product. Data structures comprising container file structures of video containers are also considered illustrative embodiments of the present disclosure. Other video container implementations are possible in illustrative embodiments. The term "video container" as used herein is intended to be broadly construed, and should not be viewed as being limited to the particular features of the video container 300 or other example video containers described herein.

Figure 4:
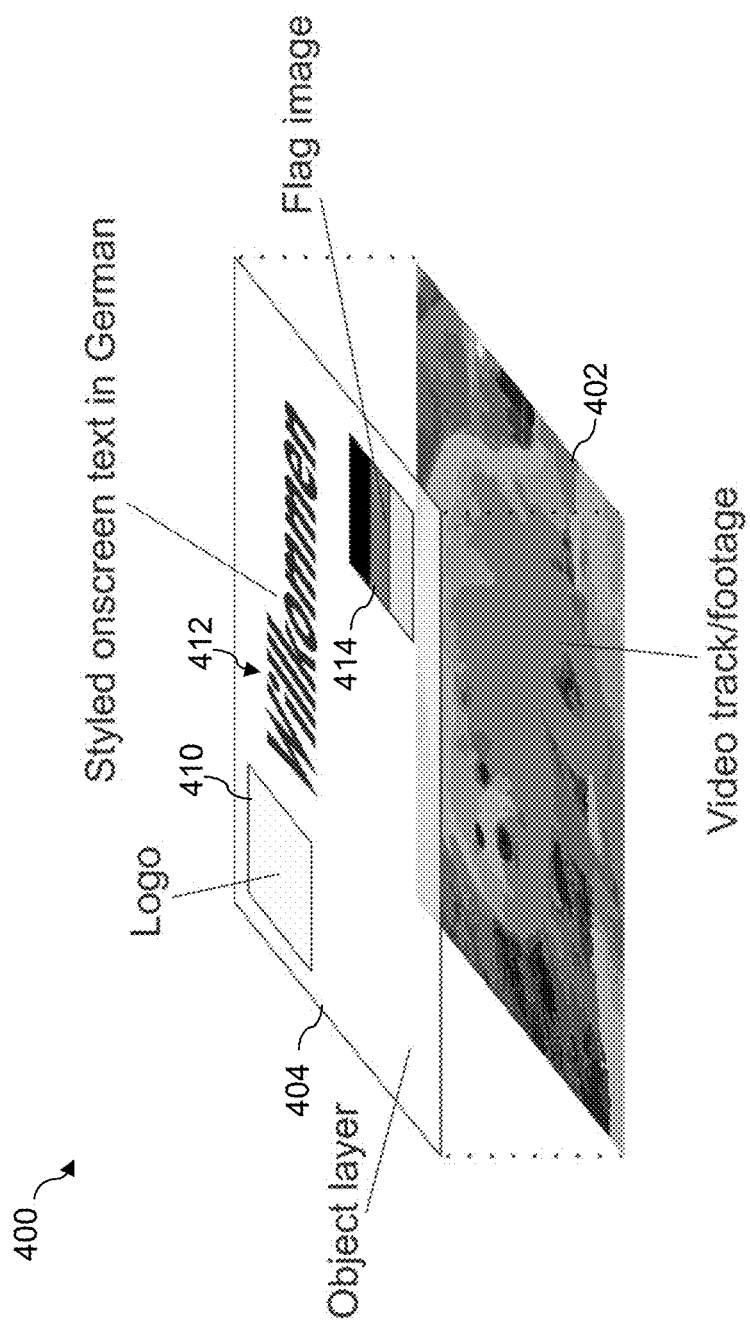
FIG. 4 shows an example of a portion of an output presentation upon playback of a video container with editable presentation objects in an illustrative embodiment.

FIG. 4 shows an example of a portion of an output presentation 400 generated upon playback of a video container with editable presentation objects in an illustrative embodiment. The output presentation 400 is part of a rendered display that includes a video layer 402 and an object layer 404. The video layer 402 includes decompressed video, also referred to in the context of this embodiment as "footage," of a selected video track, and the object layer 404 includes various presentation objects and is arranged as an overlay relative to the video layer 402. A multi-layer output presentation of this type is generated using a video container playback process such as that of FIG. 2B.

The portion of the output presentation 400 shown in FIG. 4 illustratively comprises a single frame of the decompressed video of the selected video track as presented in the video layer 402, and other frames of the decompressed video of the selected video track are assumed to be presented in a similar manner, with controlled display of presentation objects in the object layer 404 over particular frames of the video layer 402 in accordance with the corresponding object instructions. The separation shown between the object layer 404 and underlying video layer 402 in FIG. 4 is an abstraction for simplicity and clarity of illustration only, and it is to be appreciated that the two layers effectively appear to a viewer as a single composite video frame in the corresponding rendered video output. The term "layer" as used herein in conjunction with video presentation is therefore intended to be broadly construed, and can refer to different sets of video information that are combined in conjunction with video rendering to produce a sequence of composite video frames on a display.

The particular presentation objects that are part of the object layer 404 in this example include presentation objects 410, 412 and 414. Presentation object 410 comprises a first image, and more particularly a logo, such as a corporate logo or other type of logo. Presentation object 412 comprises stylized onscreen text providing a welcome message in German ("Willkommen"). Presentation object 414 comprises a second image, and more particularly an image of the German flag. As indicated previously, such presentation objects are editable without decompressing and recompressing the underlying video track.

For example, a user via an editing interface of a processing platform can edit the presentation objects by altering the images, the onscreen text and/or their manner of presentation. Terms such as "edit," "editable" and "editing" when used herein in conjunction with presentation objects are intended to be broadly construed, so as to encompass arrangements involving replacement, modification or other alterations of associated object instructions that control various aspects of the display of those presentation objects in conjunction with playback of a corresponding video track of the video container. Thus, for example, editing of a presentation object comprising an image can include replacing a particular image with another image, such as replacing a German language logo with a logo in another language, or replacing a German flag image with a flag image of another country. Similarly, editing of a presentation object comprising an onscreen text can include replacing a particular onscreen text with a corresponding onscreen text in another language, such as replacing a German language welcome message with a welcome message in another language.

A user can add new objects and corresponding instructions to a given video container at any time via an editing interface of a processing platform with video container generation and/or playback functionality as disclosed herein. As another example, if the given video container were initially created using only German language presentation objects, a user can add corresponding presentation objects in one or more other languages, with the presentation objects in a particular one of the languages being automatically selected for display responsive to selection of the particular language for playback of the video container.

A wide variety of other types of editing of presentation objects can be supported via an editing interface of a processing platform with video container generation and/or playback functionality as disclosed herein.

FIGS. 5 and 6 show respective pseudocode examples for displaying a logo and onscreen text on top of a video track in illustrative embodiments.

Referring initially to FIG. 5, a set of pseudocode 500 for an example editable presentation object of a video container identifies a particular image to be displayed, illustratively a German language version of logo 410, as well as a begin time and an end time for its presentation over the video track, display coordinates, and activation or deactivation status of presentation effects such as fade-in and fade-out. In this example, the fade-in effect is deactivated ("false") and the fade-out effect is activated ("true").

Turning now to FIG. 6, another set of pseudocode 600 for an example editable presentation object of a video container identifies a particular onscreen text to be displayed, illustratively the German language welcome message of onscreen text 412. The set of pseudocode 600 further identifies a begin time and an end time for presentation of the onscreen text over the video track, font name, style and weight, text shape, display coordinates and resizing ("resize-with-video"), and activation or deactivation status of presentation effects such as fade-in, fade-out and shadow. In this example, the fade-in and fade-out effects are both activated ("true") and a particular type of shadow effect ("lower right") is also activated.

The sets of pseudocode 500 and 600 of respective FIGS. 5 and 6 are presented by way of illustrative example only, and numerous other types and arrangements of editable presentation objects can be incorporated into a video container using other sets of instructions to control various aspects of the display of those presentation objects with an associated video track. As indicated previously, altering one or more object instructions that control various aspects of the display of a presentation object is considered a type of "editing" of the presentation object as that term is broadly used herein. A presentation object of a video container can therefore be edited by altering its associated object instructions within the video container. Numerous other types of editing are also supported.

It was indicated above in the context of the embodiment of FIG. 1 that a wide variety of different types of systems comprising one or more processing platforms can be used to implement video container generation and/or playback functionality as disclosed herein.

Another example is information processing system 700 as shown in FIG. 7. In this embodiment, system 700 comprises a video container generation and playback platform 702, coupled to local media drives 704 and a video output display 706. The video container generation and playback platform, which may comprise, for example, a computer, mobile telephone or other type of processing device, includes a video container editing interface 708, a video container player 710, and internal video container storage 712.

The video container player 710 illustratively comprises an otherwise conventional media player, suitably modified to render presentation objects of an object layer in conjunction with video of a video layer as disclosed herein. For example, otherwise conventional media players based on standards such as MP4, H.264, HEVC, MKV, AVI, Google VP9 and others can be adapted for use in video container player 710.

In one possible mode of operation of system 700, a user can load one or more existing video containers from the local media drives 704 into the internal video container storage 712, and edit the presentation objects thereof using video container editing interface 708. Such editing of presentation objects of an existing video container is considered a type of video container "generation" as that term is broadly used herein. The resulting video container having the altered presentation objects can be stored in internal video container storage 712 and/or stored on local media via one of the local media drives 704. It can also be played back via the video container player 710, resulting in rendering of the presentation objects over a video track via the video output display 706.

Additional or alternative operating modes involving generation and/or playback of video containers can be supported in system 700 and in other systems described herein.

Illustrative embodiments of information processing systems with video container generation and/or playback functionality as disclosed herein can provide a number of significant advantages relative to conventional arrangements.

For example, some embodiments are advantageously configured to allow editing of videos to be performed by relatively unsophisticated users, without the need for professional video editors or overly complex video editing software. Reviewers can in many cases make their own revisions through simple editing of the presentation objects. The time and cost associated with video editing is thereby considerably reduced.

In some embodiments, a video container is configured to include both editable presentation objects and compressed video of a video track. The editable presentation objects are rendered with the video track in a consistent manner across any of a wide variety of different processing platforms supporting the video container format.

Illustrative embodiments greatly simplify video creation, deployment and globalization processes and bring significant cost reductions. For example, some embodiments allow video editors to concentrate on more high-level work, like creating new videos, instead of working on revisions.

Also, a single video container can support multiple distinct playback instantiations, such as with presentation objects in different languages, without the need to create entirely separate videos for each such instantiation. Illustrative embodiments therefore considerably reduce video storage space requirements relative to conventional approaches.

In some embodiments, translation is done without the need for complex video editing tools. Translators can work on videos directly in standard localization tools. While the size of a video container will increase with each distinct presentation object translation that is added, the total file size will be substantially less than that which would otherwise result from creating a separate version of the video for each language.

Illustrative embodiments provide a wide variety of different types of platforms with editing interfaces that allow easy editing of presentation objects at any time.

Some embodiments are configured to facilitate the work done by localization service providers, including video localization services that involve translating videos to large numbers of different local languages.

Illustrative embodiments facilitate the manner in which videos with complex contents are created, deployed and globalized by a wide variety of different commercial and consumer video platforms.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As indicated previously, components of an information processing system as disclosed herein can be implemented at least in part in the form of one or more software programs stored in memory and executed by a processor of a processing device. For example, at least portions of the storage functionality of one or more components of a host device or storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, processing devices, processing platforms, video containers, container file structures, presentation objects, object instructions and other components and features. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a processing device comprising a processor coupled to a memory;
the processing device being configured:
to obtain at least one video track comprising compressed video; and
to combine the video track with one or more presentation objects into a video container;
wherein the one or more presentation objects are configured for presentation in an object layer arranged as an overlay relative to a video layer comprising decompressed video of the video track in conjunction with playback of the video container.

2. The apparatus of claim 1 wherein the one or more presentation objects are editable by a user subsequent to the combination of those presentation objects with the video track into the video container.

3. The apparatus of claim 1 wherein the one or more presentation objects remain separate from the video track in the video container.

4. The apparatus of claim 1 wherein the video container further comprises at least one of:
one or more audio tracks associated with the video track; and
one or more sets of subtitles associated with the video track;
wherein the one or more presentation objects are separate from said at least one of the one or more audio tracks and the one or more subtitles.

5. The apparatus of claim 1 wherein the one or more presentation objects comprise at least one image.

6. The apparatus of claim 5 wherein the one or more presentation objects comprise a plurality of distinct images and wherein at least a particular one of the plurality of distinct images is automatically selected for presentation in the object layer in conjunction with playback of the video container.

7. The apparatus of claim 1 wherein the one or more presentation objects comprise at least one set of text.

8. The apparatus of claim 7 wherein the one or more presentation objects comprise a plurality of distinct sets of text and wherein at least a particular one of the plurality of distinct sets of text is automatically selected for presentation in the object layer in conjunction with playback of the video container.

9. The apparatus of claim 1 wherein the one or more presentation objects comprise at least one animation object.

10. The apparatus of claim 9 wherein the one or more presentation objects comprise a plurality of distinct animations and wherein at least a particular one of the plurality of distinct animations is automatically selected for presentation in the object layer in conjunction with playback of the video container.

11. The apparatus of claim 1 wherein the video container further comprises one or more sets of instructions for controlling automatic selection and presentation of at least a particular one of the one or more presentation objects in the object layer in conjunction with playback of the video container.

12. The apparatus of claim 11 wherein the one or more sets of instructions are editable by a user to adjust a manner in which the one or more presentation objects are presented in the object layer in conjunction with playback of the video container.

13. The apparatus of claim 1 wherein the video container further comprises one or more sets of embedded fonts for rendering text of at least one of the one or more presentation objects in conjunction with playback of the video container.

14. The apparatus of claim 1 wherein the one or more presentation objects comprise a plurality of presentation objects in respective different languages and user selection of at least one of an audio track in a given language and a set of subtitles in the given language automatically triggers selection for presentation in the overlay layer of at least a corresponding one of the presentation objects in the given language to the exclusion of one or more other ones of the presentation objects not in the given language.

15. A method comprising:
  obtaining at least one video track comprising compressed video; and
  combining the video track with one or more presentation objects into a video container;
  wherein the one or more presentation objects are configured for presentation in an object layer arranged as an overlay relative to a video layer comprising decompressed video of the video track in conjunction with playback of the video container; and
  wherein the method is implemented by at least one processing device comprising a processor coupled to a memory.

16. The method of claim 15 wherein the one or more presentation objects are editable by a user subsequent to the combination of those presentation objects with the video track into the video container.

17. The method of claim 15 wherein the video container further comprises at least one of:
  one or more audio tracks associated with the video track; and
  one or more sets of subtitles associated with the video track;
  wherein the one or more presentation objects are separate from said at least one of the one or more audio tracks and the one or more subtitles.

18. A computer program product comprising a non-transitory processor-readable storage medium having stored therein program code of one or more software programs, wherein the program code when executed by at least one processing device comprising a processor coupled to a memory, causes said at least one processing device to perform the method of claim 15.

19. An apparatus comprising:
  a processing device comprising a processor coupled to a memory;
  the processing device being configured:
  to obtain a video container which combines one or more presentation objects with at least one video track comprising compressed video; and
  to present the one or more presentation objects in an object layer arranged as an overlay relative to a video layer comprising decompressed video of the video track in conjunction with playback of the video container.

20. The apparatus of claim 19 wherein the one or more presentation objects are editable by a user subsequent to the combination of those presentation objects with the video track into the video container.

\* \* \* \* \*